(12) United States Patent
Boskovic

(10) Patent No.: US 8,880,601 B2
(45) Date of Patent: Nov. 4, 2014

(54) ARRANGEMENT AND METHOD FOR TRANSPORT SHARING WITHIN A TRUSTED NETWORK

(75) Inventor: Zeljko Boskovic, Helsinki (FI)

(73) Assignee: Bravioz Oy, Helsinki (FI)

( * ) Notice: Subject to any disclaimer, the term of this patent is extended or adjusted under 35 U.S.C. 154(b) by 452 days.

(21) Appl. No.: 13/239,941

(22) Filed: Sep. 22, 2011

(65) Prior Publication Data

US 2012/0290652 A1   Nov. 15, 2012

(30) Foreign Application Priority Data

May 13, 2011   (FI) ...................................... 20115464

(51) Int. Cl.
  *G06F 15/16*   (2006.01)
  *G06Q 10/02*   (2012.01)
  *G06Q 50/30*   (2012.01)
  *H04L 29/06*   (2006.01)
  *H04L 29/08*   (2006.01)

(52) U.S. Cl.
  CPC ................ *G06Q 10/02* (2013.01); *H04L 63/08* (2013.01); *H04L 67/18* (2013.01); *G06Q 50/30* (2013.01)
  USPC ........... 709/204; 709/205; 709/223; 709/227; 709/228

(58) Field of Classification Search
  USPC ................. 709/202–205, 217–219, 223–224, 709/227–229
  See application file for complete search history.

(56) References Cited

U.S. PATENT DOCUMENTS

| 7,080,019 | B1 | 7/2006 | Hurzeler |
| 7,756,633 | B2 * | 7/2010 | Huang et al. .................. 701/517 |
| 7,840,427 | B2 * | 11/2010 | O'Sullivan ........................ 705/6 |
| 2008/0167892 | A1 | 7/2008 | Clark et al. |
| 2008/0195428 | A1 | 8/2008 | O'Sullivan |
| 2008/0270019 | A1 | 10/2008 | Anderson et al. |
| 2009/0210276 | A1 | 8/2009 | Krumm et al. |
| 2009/0248587 | A1 * | 10/2009 | Van Buskirk ................... 705/80 |

(Continued)

FOREIGN PATENT DOCUMENTS

| WO | 2006115919 | 11/2006 |
| WO | 2006128946 | 12/2006 |
| WO | 2008094155 | 8/2008 |

OTHER PUBLICATIONS

Finnish Office Action, Application No. 20115464, dated Feb. 16, 2012.

*Primary Examiner* — Bharat N Barot
(74) *Attorney, Agent, or Firm* — Young & Thompson

(57) ABSTRACT

An arrangement, of functionally connected electronic devices includes: a data input entity, configured to obtain user information relative to a plurality of users, data indicative of trust between multiple users and data indicative of a number of ride requests and ride offers by the users, a trust network knowledgebase entity configured to establish and manage a number of trust networks on the basis of the obtained data. The knowledgebase entity groups a plurality of users into a number of trust networks, a scheduling entity configured, on the basis of the obtained data, to determine a potential transport sharing scenario for a plurality of users belonging to the same trust network. The scheduling entity is configured to find potential matches between the ride requests and ride offers to determine the scenario, and a data output entity configured to indicate the scenario to multiple users of the plurality.

20 Claims, 11 Drawing Sheets

(56) References Cited

U.S. PATENT DOCUMENTS

| | | |
|---|---|---|
| 2010/0280884 A1 | 11/2010 | Levine et al. |
| 2011/0059693 A1* | 3/2011 | O'Sullivan .................. 455/41.1 |
| 2011/0196709 A1* | 8/2011 | Huang et al. ..................... 705/4 |
| 2012/0117169 A1* | 5/2012 | Plotkin ........................ 709/204 |
| 2012/0265814 A1* | 10/2012 | Roussis ........................ 709/204 |
| 2013/0030645 A1* | 1/2013 | Divine et al. ................ 709/217 |

* cited by examiner

US 8,880,601 B2

ARRANGEMENT AND METHOD FOR TRANSPORT SHARING WITHIN A TRUSTED NETWORK

FIELD OF THE INVENTION

The present invention relates generally to computer and communication systems. In particular, however not exclusively, the invention pertains to social networks and their application in transport sharing.

BACKGROUND

Based on numerous studies the utilization rate of private vehicles is very low in a sense that many people travel alone. Typically there are at most two persons in a private car the capacity of which is, however, commonly at least four or five persons, i.e. a driver and three or four passengers, respectively. As a result, the introduced personal ecological impact is unduly high. Carbon emissions by private vehicles form a considerable portion of the carbon footprint of the individuals. Private transportation is also the most significant contributor to the overall carbon emissions and traffic conjunction. With the current rates of growth it is clear that the existing ways of transportation are not globally sustainable. Air quality in large cities is actually becoming a health hazard, whereupon the municipalities are investing more and more in optimizing traffic by employing different methods and technologies. For instance, toll charges may be collected for accessing the city centers by private cars. Many of the contemporary solutions are still clearly sub-optimum and e.g. the aforesaid tolls are commonly regarded as 'punishments' for visiting the city center, which is not a good starting point for achieving a sustainable solution.

Instead, public transportation networks usually provide the lowest carbon footprint per person of all transportation forms. The downside is that the development and operation of different elements of public transportation networks is expensive and the scope and resolution thereof will very unlikely be able to completely replace private transportation.

Thereby, sharing private transportation between individuals holds attributes that makes it suitable as a complementary service to the public transportation network. There are some systems that aim to provide service for shared transportation.

Transportation sharing (also know carpooling) solutions help users to arrange transportation (in the case of passengers) and on the other hand, share their private car (in the case of drivers) with other individuals. The motivation behind the adoption of the idea resides in the obvious gas savings achievable and a possibility to split the cost of transportation in addition to ecological benefits in terms of reduced carbon and small particle emissions.

Existing social network services like Facebook, Myspace, and Linkedin may be able to capture a number of aspects of social relationships between different users thereof. Accordingly, some of the existing transport sharing solutions may rely on users' mutual connections via social networks. However, in many scenarios the users that have validly registered a mutual 'virtual relationship' via an existing social network still have domicile in different cities or countries and thus, sharing transportation is not applicable even if a sort of a social link or social link chain between the users may seem to exist. On the other hand, the relationships may, despite of their existence, be of nature that qualifies for many things but not necessarily transport sharing.

Few transportation sharing solutions are configured to forward contact information within the userbase so that the users can contact each other to arrange suitable transport sharing scheme.

Notwithstanding the existing solutions, the problems around transport sharing are thereby not completely solved. The available social networking solutions do not seem to capture or at least exhibit those aspects of social relationships that are really meaningful for the purpose of sharing a ride. Managing the social networks in view of transport sharing is not addressed either by the known solutions. Finding or offering rides and planning the associated journeys remain tedious processes.

SUMMARY OF THE INVENTION

The objective is to alleviate one or more problems described hereinabove not yet satisfactorily solved by the current transport sharing solutions, and to provide a feasible alternative for managing transport sharing.

The aforesaid objective is achieved by the embodiments of an arrangement for transport sharing and a related method.

Accordingly, in an aspect of the present invention an arrangement, such as one or more at least functionally connected electronic devices like servers, comprises:

- a data input entity configured to obtain user information relative to a plurality of users, data indicative of trust between multiple users and data indicative of a number of ride requests and ride offers by the users, optionally also public transportation data such as schedule and route data, user location data, contextual data such as transport method and/or vehicle details data relative to a user, user calendar data, ride plan data, user history data relative to e.g. time and/or location, POI (place of interest) data, area calendar data such as city event calendar data, realtime traffic data, date data, time data, and/or event data,
- a trust network knowledgebase entity configured to establish and manage a number of trust networks on the basis of the obtained data, wherein the knowledgebase entity groups a plurality of users into a number of trust networks,
- a scheduling entity configured to, on the basis of the obtained data, to determine a potential transport sharing scenario for a plurality of users belonging to the same trust network, wherein the scheduling entity is configured to find potential, at least partial matches between the ride requests and ride offers in order to determine said scenario, and
- a data output entity configured to indicate the scenario preferably to multiple users of said plurality, wherein the determine done or more shared legs are indicated at least to the concerned users and preferably also the private legs of the overall journey of each user, if any, are indicated, wherein each private leg is optionally indicated to the concerned user only.

In one embodiment, the arrangement establishes and/or manages a trust network utilizing a number of criteria including at least one element selected from the group consisting of: indicated personal trust between multiple users, trust credentials such as a common employer, association or other organization common to multiple users, inherited trust wherein a first user trusted by a second user is then also trusted by a third user trusting the second user, user reputation optionally at least partially determined by a number of other users through rating (or voting) or some other method, and validation status of the identity of a user. A sub-network of a trust network may be determined by utilizing a certain criteria of the above only, several criteria through AND approach, and/or particular additional criteria. Likewise, an expanded trust network may be determined by utilizing multiple criteria via inclusive OR type approach, for instance. Personal and/or organizational, or mixed, trust networks may be formed.

In another, either supplementary or alternative embodiment the arrangement is configured to validate a user utilizing at least one element selected from the group consisting of: e-mail address, phone number, personal digital certificate such as mobile certificate, social security code, bank account, and TUPAS (Finnish banks' authentication service) authentication. For example, a validation request may be sent to an email address associated with service registration information. Proper response to the request, such as activation of a link included therein, may result in a successful validation such as authentication.

In a further, either supplementary or alternative embodiment the arrangement is configured to remove a user from a trust network and/or the whole service based on obtained indication of at least one predetermined criterion, the criterion being optionally selected from the group consisting of: an occurrence of a predetermined event, distrust indicated by other user, a user leaving a company or other organization providing the trust associated with the user, and user inactivity relative to a predetermined issue such as the transport sharing service in general and/or an e-mail inquiry sent to the user. A trust network, e.g. the integrity thereof, and optionally the overall service may be thus automatically managed by the provided management logic and/or manually managed by the operator thereof.

Yet in a further, either supplementary or alternative embodiment the arrangement is configured to utilize a ride request incorporating at least one element selected from the group consisting of: location of departure, destination location, desired date, desired time, desired date or time of arrival, desired date or time of departure, and desired vehicle details such as vehicle type (e.g. car or boat), fuel capacity or luggage space details.

Still in a further, either supplementary or alternative embodiment the arrangement is configured to utilize a ride offer incorporating at least one element selected from the group consisting of: location of departure, destination location, desired date, desired time, desired date or time of arrival, desired date or time of departure, used vehicle details such as fuel or energy status or capacity, and used vehicle theoretical and/or current range.

In some embodiments, a ride offer and/or ride request may be input utilizing generally similar data input logic and/or data elements, wherein the nature of the input may be indicated via a parameter implying either ride request or ride offer. The parameter may be dedicated (explicit) or it may be deduced based on the input and/or history data with reference e.g. to 'one-tap' feature explained in more detail hereinafter.

For example, if the user just inputted the details of his vehicle into the service or moves rather quick indicative of travelling with a vehicle, it is very likely that the user wants next to offer a ride. A user that has offered a ride at the same time of a day for the last twenty working days, or generally at least a predetermined number of times per a predetermined tracked history period, may be assumed to do so again. In contrast, a user that has never offered a ride and/or currently moves with so peaceful pace that is indicative of walking is a probable ride requestor.

In a further, either supplementary or alternative embodiment the arrangement is configured to monitor, preferably substantially in real-time fashion, a number of conditions such as occurrences of a number of various predetermined events and to send a related notification to a number of users and/or suggest a change in the associated scenario on the basis thereof. For instance, traffic jams, traffic accidents, protests, parking situation, weather information, vehicle fuel or energy information, calendar data change, ride provider—related data, ride requestor—related data, flight schedule changes, public transportation schedule changes, private ride schedule changes, and/or any other events potentially affecting transportation of a number of users may be tracked in order to, for example, inform the associated user(s) and/or update or at least suggest update to the ride scenario or ride plan. E-mail, text or multimedia messages may be applied for sending the information among other options. Monitoring may include data retrieval via the data input entity and optionally processing thereof for determining the status of the tracked conditions.

In a further, either supplementary or alternative embodiment the arrangement is configured to update a journey plan or a transport sharing scenario in terms of trip departure time and/or trip route on the basis of a number of monitored conditions.

In a further, either supplementary or alternative embodiment the arrangement is configured, optionally upon receipt of a generic ride input from a user, to determine at least part of a ride request and/or a ride offer, and thus at least indirectly the associated scenario, utilizing data mentioned hereinbefore. For instance, the arrangement may be configured to exploit at least one data element selected from the group consisting of: date, time, calendar data, city-related or other communal calendar data, current location of a user, estimated current location, estimated location of departure, estimated destination location, available ride offer, POI (place of interest) data relating to a number of users, and history data relative to a number of users. The history data may include locations visited in relation to time, e.g. on a regular basis, and/or used means of transportation, e.g. public transportation or a private car. History data may be capitalized in generating POI data. For example, regularly utilized location by the user (destination or departure location of a trip) may be defined as POI after fulfilling a predetermined criterion for POI establishing.

Indeed, e.g. so-called one-tap scenario is possible wherein a user simply initiates scenario search in the transport sharing service by only a few, optionally a single, gesture like a button press or touch action. Optionally the user omits manually inputting any other information. However, he/she may indicate also the type of the desired scenario from his/her point of view, e.g. a ride offer or a ride request, but even that may in some embodiments be deduced based on the available data by the arrangement. The arrangement may be configured to determine and estimate the variables required for scenario determination utilizing one or more of the aforesaid elements. A number of transport sharing scenario options may be disclosed to the user. The options may include a number of options wherein the user acts as ride provider and/or options wherein the user acts as a ride requestor, or only a number of options of one category may be disclosed based on the estimated role of the user (provider/requestor).

In a further, either supplementary or alternative embodiment, the arrangement may be configured to determine an area and/or radius of interest around a departure location, destination location, intermediate location (route node) and/or or current location of a user. The area and/or radius may be utilized to find potentially meaningful POIs of a number of users, taxi stops, location(s) relevant in terms of public transportation such as bus stops, tram stops, train platforms, ferry docks, or metro stations, and/or ride options (e.g. departure, destination or intermediate node locations of ride offers) offered by a number of users in order to facilitate determining the scenario, for instance.

In a further, either supplementary or alternative embodiment, the arrangement may be configured to apply, optionally as user-controllable criterion, carbon footprint data for determining the scenario. Alternatively or additionally, a carbon footprint estimate may be determined for the established and/or implemented scenarios or at least a number of legs (such as shared ones) thereof. Different means of transportation may be associated with predetermined amount of emissions. The utilized emission data may be coarse, e.g. vehicle-type based (private car, bus, motorcycle, etc.), or of finer resolution (e.g. private cars may be classified into SUV, family car, and compact car categories). In some embodiments, e.g. vehicle-model based data provided by the vehicle manufacturer or e.g. a national vehicles or transport regulation authority may be applied, which may practically imply utilizing as accurate emission figures, such as CO2 emission figures optionally in g/km format, as being generally publicly available in the determination. A collective minimization goal of carbon emissions may be utilized while matching the ride offers with ride requests, for instance.

In various embodiments of the present invention, the suggested solution may enable providing a valid transportation sharing scenario and other, optionally userspecific private guidance preferably for the entire journey of each user from the place of departure to the destination location. Different legs of the journey of a user may be executed using different transportation methods. Walking may be included as one technique of transportation that is to be used in connection with a number of journey legs, for instance.

In another aspect of the present invention, a method for managing transport sharing, preferably to be executed by at least one computer, comprises:

obtaining user information relative to a plurality of users, data indicative of trust between multiple users and data indicative of a number of ride requests and ride offers by the users, optionally also public transportation data such as schedule and route data, user location data, contextual data such as transport method and/or vehicle details data relative to a user, user calendar data, ride plan data, user history data relative to e.g. time and/or location, POI (place of interest) data, area calendar data such as city event calendar data, real-time traffic data, date data, time data, and/or event data, establishing and managing a database of trust networks on the basis of the obtained data, wherein the knowledgebase entity groups a plurality of users into a number of trust networks, determining a potential transport sharing scenario for a plurality of users belonging to the same trust network, wherein the scheduling entity is configured to match a ride request with a ride offer in order to determine said scenario, and indicating the scenario to said plurality of users, wherein at least a shared leg of the potentially different personal overall journeys of said plurality of users is indicated.

Yet, a system comprising an embodiment of the arrangement and a terminal device such as a mobile device configured to at least provide a UI to the user for accessing and utilizing the arrangement may be established. The mobile device may include a cell phone, a smartphone, a tablet, or a laptop computer, for instance. The applicable terminal may generally incorporate also a desktop computer or vehicle-fixed computing equipment such as navigation equipment. In some embodiments, the terminal may include necessary hardware and software for executing at least a limited number of functionalities of the arrangement as well.

In some embodiments, the terminal may be provided with a web browser and optionally further elements cooperating therewith for providing the UI and/or other functionalities. Additionally or alternatively, a dedicated client application executable in the terminal may be utilized.

The previously presented considerations concerning the various embodiments of the arrangement may be flexibly applied to the embodiments of the method mutatis mutandis and vice versa, as being appreciated by a skilled person.

The utility of the present invention arises from a plurality of issues depending on each particular embodiment. Firstly, the invention may enable constructing various different applications capitalizing the concept of trust networks. In the context of transport sharing, the trust networks may essentially capture trust level between a vehicle driver and passenger(s), for example. Indeed, the trust levels between users that have been already established in real life can now be captured and exploited in a natural manner. The trust networks may be created, managed, and terminated by the embodiments of the present invention. Different levels of trust may be made available.

Transport sharing preferably provides a holistic approach. If the user is looking for transportation and there is available rides with in his/hers trust network for only one or few of the legs of the overall journey, the solution is capable of matching public transportation options with ride sharing options to construct a personalized transport scenario for each user then having both shared legs (private transportation utilized by multiple persons; thus these legs belong to a plurality of personal transportation sharing scenarios of corresponding plurality of people) and other legs such as legs capitalizing public transportation and/or private transportation legs without the sharing aspect. Based on e.g. public transportation routes and real-time data the arrangement may suggest most suitable legs of transportation. Schedule and/or map of each transportation node, departure and/or destination location may be made available to a user via mobile and/or web and/or in-vehicle such as in-car computing system.

Further, the goal of tracking and optionally reducing the emissions such as carbon emissions created in private or other transportation may be fulfilled.

Real-time tracking of various relevant events may be utilized in dynamic adaptation of existing trip plans or transport sharing scenarios.

In addition, one-tap scenarios may enable ride sharing without exhaustive data input by the users based on e.g. background-executed analysis regarding the current context of the user (temporal, geographical, etc.) and his/her current and/or historical behavior such as recognized habits relating to transportation.

The expression "a number of" refers herein to any positive integer starting from one (1), e.g. to one, two, or three.

The expressions "a plurality of" and "multiple" refer herein to any positive integer starting from two (2), e.g. to two, three, or four.

The terms "trip", "commute" and "journey" are utilized herein interchangeably.

The term "private transportation" refers herein to the use of substantially private vehicle such as a car or a motorcycle (in theory also bicycle), taxi, rickshaw, shuttle service, vehicle rental service such as a car, boat or jet rental service, or any similar option of transportation.

Different embodiments of the present invention are disclosed in the dependent claims.

BRIEF DESCRIPTION OF THE RELATED DRAWINGS

Next the invention is described in more detail with reference to the appended drawings in which FIG. 1 is a conceptual illustration of personal trust relationships between one and his/her 'trustees' (trusted persons) and of an embodiment of inherited trust.

DETAILED DESCRIPTION OF THE EMBODIMENTS

Figure 1:
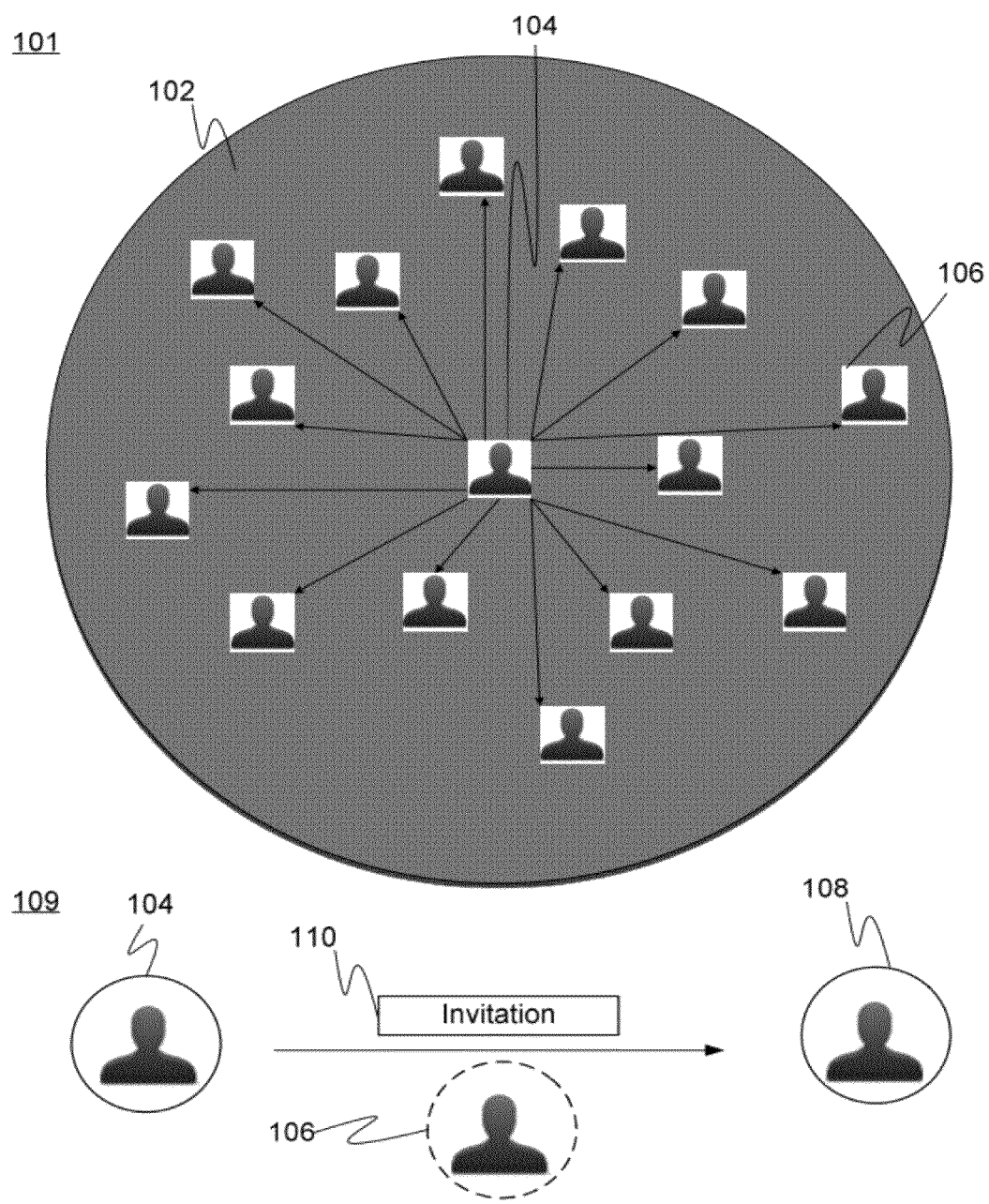

FIG. 1 depicts the concept 101 of trust relationships in one potential embodiment thereof. Each user 104 typically has a number of own personal trusted contacts 106 forming a trust network (TN) 102 an indication of which may be captured by an embodiment of the arrangement suggested herein. This TN thus refers to a group of people that the user 104 trusts. Naturally there may be several different levels of trust among people, but in the context of the present invention we may, at least in some embodiments, content ourselves e.g. with a binary type trust indicating whether we trust somebody so much to share a ride or not. Optionally, a plurality of trust levels may be established and other users allocated to them from the standpoint of a certain user.

There are basically numerous ways how that the trust relationship may be established as contemplated hereinbefore. A trust relationship may be based on an established personal relationship and/or some common factor(s). The persons potentially bearing some level of mutual trust may work for the same corporation and/or other organization, i.e. a number of different trust credentials may be considered. Trust is also possible between organizations.

A user may create a personal service account utilizing online or mobile access solution available for accessing an embodiment of the arrangement providing the TN-exploiting service according to the present invention. A user account may be associated with a user name and password for authentication purposes, for instance.

The user may be validated based on a number of factors such as a preferably unique (identifier) email address or a personal phone number, for instance. A related notice may be sent to the email address or phone number. After confirmation action such as reply or related link activation, for example, which optionally also fulfills a number of additional conditions, the user may be accepted to join the service.

After creating the account the users may be generally able to create offers for sharing transportation, i.e. ride offers, or requests for transportation, i.e. ride requests, towards the online community and in particular, the trustees. An essential part of making a decision about to whom to offer a ride and/or with whom to share a ride may indeed be the trust between individuals. Thus the users are provided with an opportunity to create their individual personal TN, or even a plurality of them, via the service. An individual (personal)TN may be implemented as a group of other users that the first user has trust relationship with, the relationship being sufficiently strong for sharing transportation with in private. In contrast, specific registered trust is not typically needed in the case of sharing public transportation due to natural trust for such activity, i.e. people generally tend to believe they are safe in public spaces including public transportation etc. The users are advantageously able to invite other persons to join the service and/or their TN using the others' personal email or phone number as invitation addressing technology. A user may invite others to his/her TN, preferably both current users of the service and persons having not registered yet. After accepting the invitation the invitee may be added to the TN of inviter. Correspondingly, a user may suspend a person's membership from his/her trust network.

A number of selected TNs may be utilized as a target of ride offer or request—related broadcasts/multicasts/unicasts via the service by a user. Alternatively or additionally, some other portion of the service users, e.g. a portion of a TN, or in some occasions, even all the service users, may be assigned as targets of a ride request or ride offer in the service.

Figure 2:
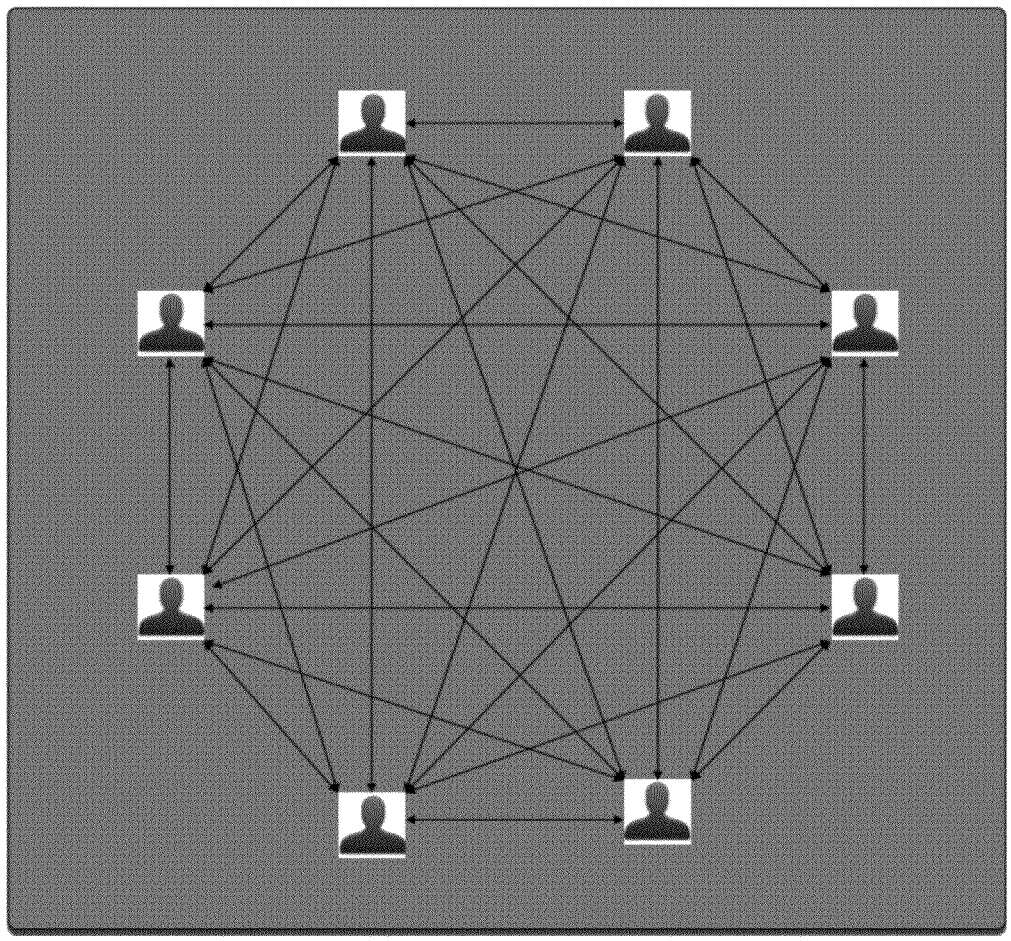
FIG. 2 is a conceptual illustration of an embodiment of a corporation or other organization-related trust network.

With reference to the scenario 201 of FIG. 2, a user may indeed belong to an entity within which there preferably remains a certain inherent or otherwise already-established trust level and transparency considering, for example, corporation, a club, or other organizational entity. The figure represents an example of corporation/organizational TN with eight members who may, due to the organizational connection, be directly trusted by each other from the standpoint of the service as being highlighted in the figure by bidirectional arrows between each user. Basically, a member of an organization may validate others utilizing the mutually available trusted data source such as a corporate or organizational address book, for instance. Some persons may also know each other personally or by name or 'face', but still they may also verify each other utilizing the standard corporate/organization tools. Additionally, e-mail and/or mobile phone-based validation may be utilized.

Each member of a TN, such as the aforesaid organizational TN, thus preferably shares a level of trust that provides a base for successful implementation of transportation sharing solution within the TN. The users may in some embodiments expand and personalize their organizational TN by establishing individual trust relationship with a number of further users, or vice versa.

A TN based on e.g. established direct and/or inherited personal relationships and associated trust, and on the other hand, a credentials-based, optionally more or less automatically formed (the organizational entity may submit initial user information to the service, for example), TN may overlap. And, different trust networks may form an aggregate TN in the service. Likewise, a sub-network may be formed from an existing TN. There are various different options for managing and utilizing TNs in the context of the present invention.

One user may belong to a number of trust networks such as his/her personal TN and a corporate TN. When an organization is added to the service, all individuals that are already members of the service and belong to that organization, may be optionally automatically allocated as members to the TN of that organization as well. New users may be then invited by sending an invitation email or (text/multimedia) message, for instance, providing instructions on how to complete the validation process. After validation, the users may be added to the organizational TN. An organizational TN may be managed by a number of common and/or dedicated administrators (superusers). Administrator may be able to suspend an existing user or to invite a new user to join their specific organizational TN.

Automatic administration of organizational TN may be performed based on a number of pre-defined criteria. If the user is no longer member of the organization itself, the user will be removed from the organizational TN, for instance. Based on e.g. user activity and/or activities, the service may be configured to send, optionally TN-specific, confirmation or validation message, which approach may be additionally or alternatively applied to personal TNs as well. If the (e-)mail address or phone number seems to be no longer available (e.g. an error message returned) or the user does not respond to a (re)validation or confirmation request, he/she may be removed from the associated (organizational) TN.

As further options, trust inheritance, user validation status and/or user reputation based on e.g. ratings are potential sources of trust. Regarding the inherited trust and reverting to item 109 of FIG. 1, one embodiment for registering it in the service arrangement of the present invention incorporates sending a TN join invitation 110 by user A 104 to user C 108 to join A's TN when user C 108 belongs to the trust network of user B 106 and User B 106 belongs to the TN of User A 104 as shown in the figure at 101. In this scenario a user may inspect the other trusted users of his/her own trusted contact. Alternatively, the user A 104 may be provided with an option to send to all contacts of the trusted user B 106 a trust relationship request without knowing their identity.

Figure 3:
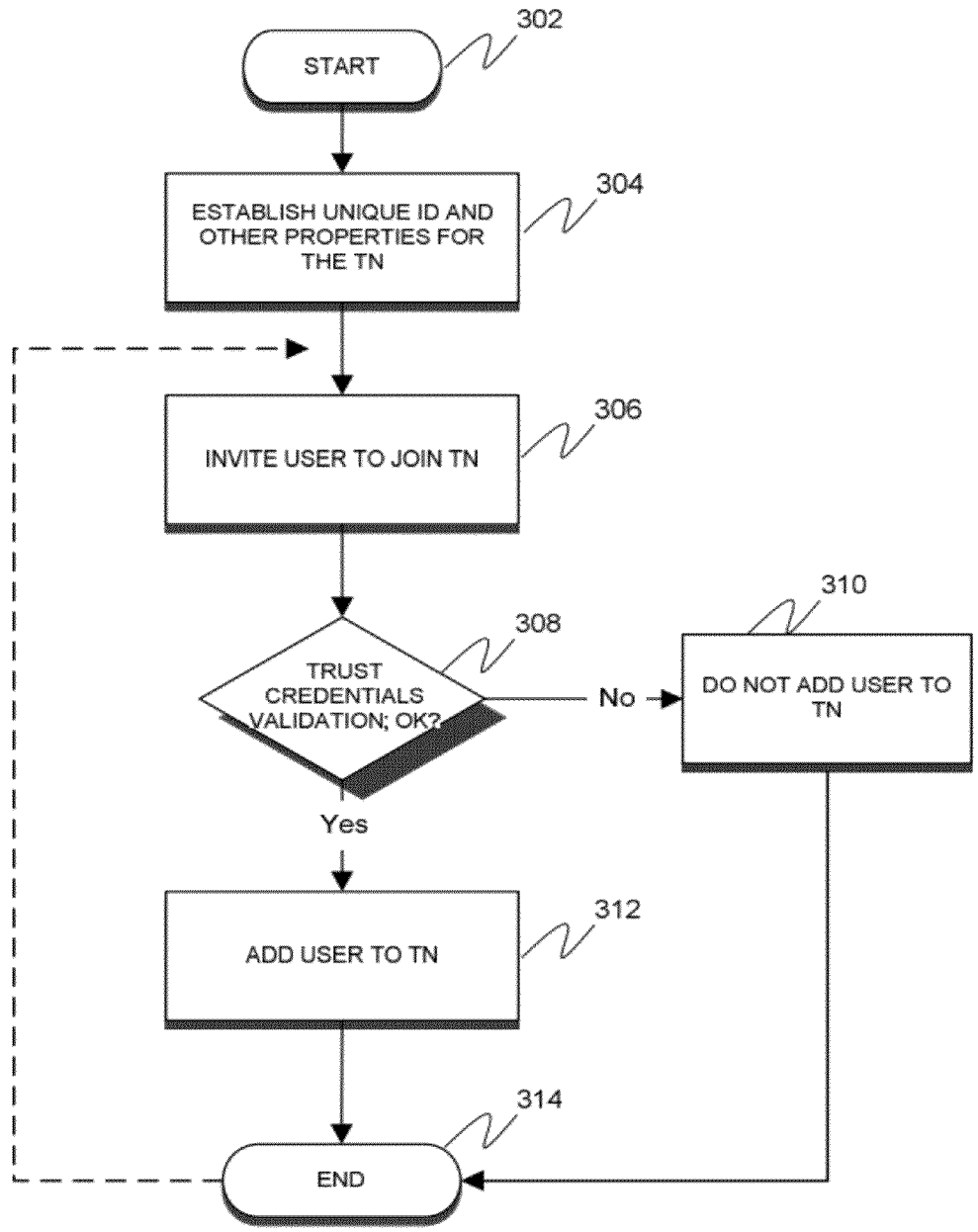
FIG. 3 is a flow chart disclosing an embodiment of a process for establishing and managing a trust network.

FIG. 3 discloses an embodiment of a process for establishing and managing a trust network. At 302, the necessary hardware and software such as a server for running the service and a terminal for accessing the service may be obtained and configured via acquisition and installation of related software, for example.

At 304, a service user may request the service, via the terminal, to create a trust network or the service may generate a blank trust network automatically with necessary management data such as identifier.

At 306, the user may trigger sending a join request regarding his/her trust network to other user. Several join requests, each targeted to a certain user, may be alternatively transmitted. The join request may incorporate or trigger sending a separate join request for the service in general in case the other user is not registered therewith yet. Join requests and related communication are preferably private and only the parties concerned may contemplate them via the service. The requests may be in the form of messages such as e-mail messages and/or textual messages (e.g. SMS, short message service) or multimedia messages (e.g. MMS, multimedia messaging service). For example, an e-mail request may be supplemented with an SMS or other notification message indicative of the pending request and sent to the mobile device of the other user. The request message may include a secure, optionally temporally limited, link the activation of which triggers the answering procedure and optionally the actual acceptance of the request. Answering the request according to predetermined one or more criteria, such as temporal criteria (e.g. within time limit set), which is checked at 308, triggers adding the other, now validated, user to the trust network 312. Alternative or additional user validation actions based on the desired trust credentials may be executed as generally described herein. In the case of a failure to answer the request according to the criteria and/or fail of other conditions, the other user is not added to the TN (notice item 310) and the inviting user may be notified accordingly.

At 314, the process execution may be ended. A skilled person will realize that the items 305-312 may be repeated and executed also at least logically in parallel for adding several users to the TN, which is indicated in the figure by the broken feedback arrow. In some embodiments, a join request may be transmitted to an organization, whereupon e.g. an organization-specific superuser may be requested to centrally answer thereto. Alternatively, the requests may be delivered to a plurality of users, potentially all users or selected users, within the organization. As a result, each or a selected number of users of the organization may be added or at least considered as trusted to the inviting user.

In some embodiments, the request may be location-specific, e.g. geographically limited, such that it includes data such as a link that cannot be validly activated elsewhere than from a predetermined location, which may be determined using IP (Internet Protocol) address or positioning data such as cell data or satellite (e.g. GPS, Global Positioning System) data, for instance. Alternatively or additionally, the answering procedure may incorporate location checks, which lead to procedure failure unless the related conditions are met.

Figure 4:
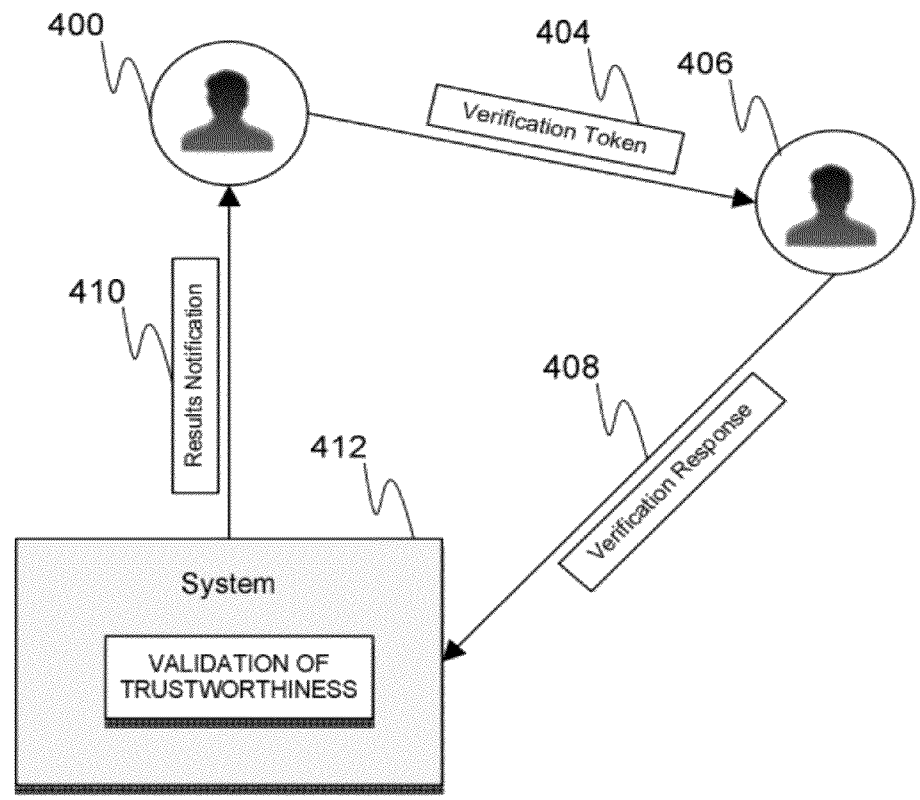
FIG. 4 illustrates an embodiment of trustworthiness validation.

FIG. 4 illustrates an embodiment of user validation to be utilized for establishing trust relationships via the service. The procedure may be utilized in connection with TN establishment as shown in FIG. 3, for example, with particular reference to the item 308 thereof. Also TN integrity management may benefit from the solution as being disclosed hereinafter relative to FIG. 5.

Upon establishing or expanding a TN, the inviting/validating user 400 may send or at least indirectly trigger sending verification token 404 such as a request message to the invited/validated user 406 either directly or via the service 412. The user 400 may reply 408 to the token 404 and the reply may assessed by the service 412. Analysis results notification 410 may be then provided to the inviting/validating user 400. Alternatively or additionally, the response 408 could be provided to the user 400 who could verify it and inform the service about the outcome. Verification token 404 may utilize various applicable trust credentials as reviewed herein earlier such as known contact data such as e-mail and/or cell phone data of the user 406 and/or location-sensitive links, for instance.

Figure 5:
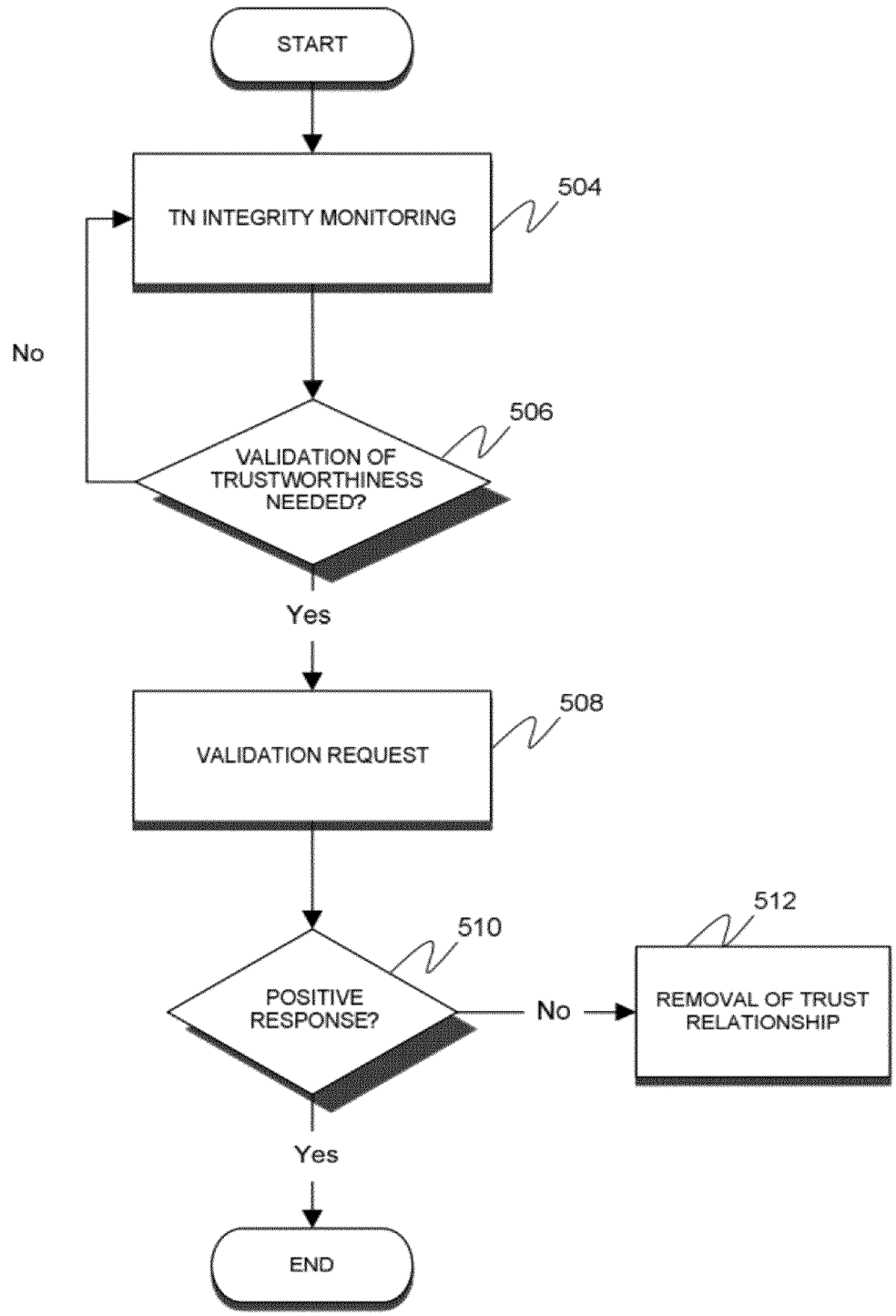
FIG. 5 is a conceptual illustration of an embodiment of trust network integrity management process.

FIG. 5 is a flow diagram representing selected aspects of an embodiment of TN integrity management. The service may be configured to automatically monitor 504 the integrity of established TN's according to e.g. predetermined logic. The logic may be general and applicable to all TN's or it may be TN-specific. The logic may be optionally user-controllable. Additionally or alternatively, integrity management may be based on the assessment by service administrators who may bear rights relative to the whole service or at least certain organization(s). Monitoring may include receiving preferably automated but optionally also manual, such as user-submitted, notifications, for example. A notification may relate to the monitored passivity of a TN member (account inactivity) or e.g. notice about a user such as an employee, also being the user of the service, leaving an organization represented in the service by at least a number of users.

The notifications may trigger executing a number of further operations such as user trustworthiness verification 506, whereupon a validation request 508 may be sent. E.g. the procedure of FIG. 4 may be applied (the service or the admin may represent the user 400 in this case). Validation request 508 (or verification token in the context of FIG. 4) may include a request message whereto the target user should reply within a predetermined response, for example. The message may include a link the activation of which may result in a positive validation provided that optional other conditions such as location criterion is fulfilled. Positive validation 510 typically leads to maintaining the challenged user in the TN, whereas negative outcome due to e.g. lack of response or erroneous delivery of the request message may lead to the removal of associated trust relationship and TN membership 512, if not the whole service account particularly in cases where the user is passive relative to the service in general, not just some certain TN.

For example, if the user in question held solely organization-based trust relationship(s) via the service, cancelling the user's membership in the organization may lead to his/her removal from all TN's he/she was a member of as the monitoring 504 may trigger the service to send a number of validation requests 508 to the email address of the user associated with the organization, i.e. an e-mail address the user cannot anymore access for obtaining the request or replying thereto.

Figure 6:
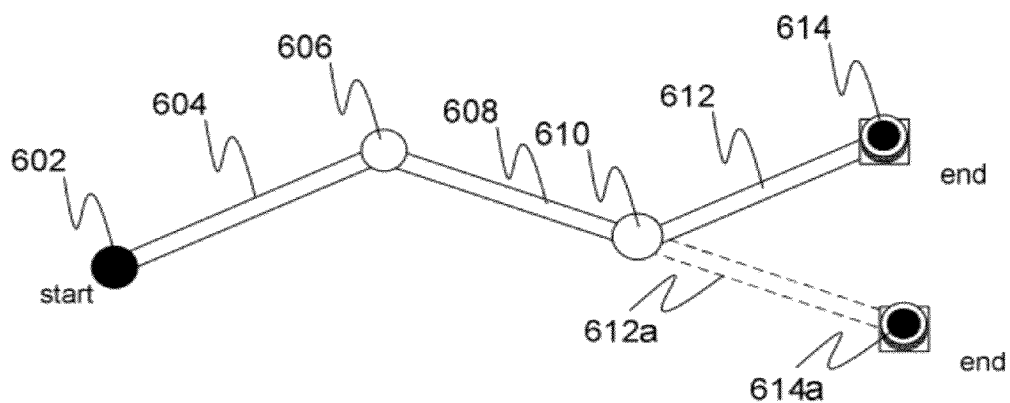
FIG. 6 illustrates ride planning with both public transportation and (private) transport sharing aspects in accordance with an embodiment of the present invention.

FIG. 6 illustrates ride planning by the service with both public transportation and transport sharing aspects in accordance with an embodiment of the present invention. A journey of a service user includes the location of departure 602 and destination 614. Transportation sharing may take place during the journey relative to the whole journey or in relation to applicable portions, i.e. legs, 604, 608, 612 thereof connecting the intermediate nodes 606, 610 and end points 602, 614 of the journey together in a feasible manner. Each leg may be executed using a different transportation method.

The service solution may be configured to construct and propose the most suitable scenario preferably based on user-preferred criteria and/or with a holistic approach. For example, when the user is looking for transportation and indicates a ride request to the service, and there is available ride offer in his/her trust network for at least one of the legs, the service solution will book that ride, inform the concerned users (i.e. ride requestor(s) and provider(s)) about the shared ride plan between the location of departure 602 and e.g. node 610 and optionally provide detailed information about public transportation such as bus optionor e.g. suggested walking trip from the transportation node 610 until the destination 614 at least to the ride requestor as the ride provider may continue, according to the ride offer he/she announced, from node 610 to different end point 614*a* via leg 612*a*. Even for the ride provider, the service may be configured, in some embodiments thereof, to provide real-time route information and e.g. navigation instructions regarding his/her whole journey, not just the shared part.

Depending on the remaining available passenger capacity of the ride provider, the ride offer may be then removed from the service or shown as fully booked (e.g no free seats in the vehicle), or the offer may remain therein preferably with indication of free passenger slots. In connection with each ride offer, the service may be indeed configured to indicate the available person and optionally pet slots provided that the ride provider has indicated such information in the first place or it could have been deduced based on the available data (e.g. with motorcycle, typically only one slot for passengers is available and with a small van, there could only be two passenger seats). Otherwise, it may be presumed by the service that at least one free slot is available per each ride offer input.

Based on a ride request, the service may be configured to utilize a proximity model an embodiment of which is described in more detail hereinafter relative to FIGS. 11 and 12. The service may be configured to determine areas around the desired departure and destination locations and to further determine, on the basis of available ride offers relating to rides wherein the offered route itself such as some nodes, e.g. departure, destination or intermediate nodes, thereof substantially matches any of the areas according to the utilized distance criterion, for instance, and the offered ride schedule also substantially matches, according to the utilized criterion, the schedule indicated by the request. To determine intermediate nodes for rides that have been basically defined more coarsely e.g. via departure and destination location only, the service may be configured to estimate a number of potential routes between them by connecting these two locations via available known or determinable route segments such as road segments. Estimation of arrival at each intermediate trip node may be made based on vehicle data, schedule data, and/or calendar data, for instance. If a match is found, the service may be configured to determine and indicate a transportation sharing scenario on the basis of the overlap between the offer and the request. If multiple offers have some overlap with the request, the service may be configured to rank those based on predetermined criteria and/or to combine them to provide a more comprehensive shared journey to the ride requestor, if necessary and being possible in terms of the utilized criteria.

Schedule and preferably map of each transportation leg of the journeys having at least one shared portion, preferably at least of departure and/or destination locations, may be provided to the concerned users. Each user may preferably obtain useful information such as schedule and/or map data about his/her personal overall journey to his/her terminal device such as a portable computer, a smartphone or a in-vehicle navigation, computing and/or communications system. Other users' journeys may be kept secret except the shared portion(s). Alternatively, each user's overall journey and related data may be at least partially available to the other users, such as users participating in the scenario, in relation to at least one leg thereof.

Figure 7:
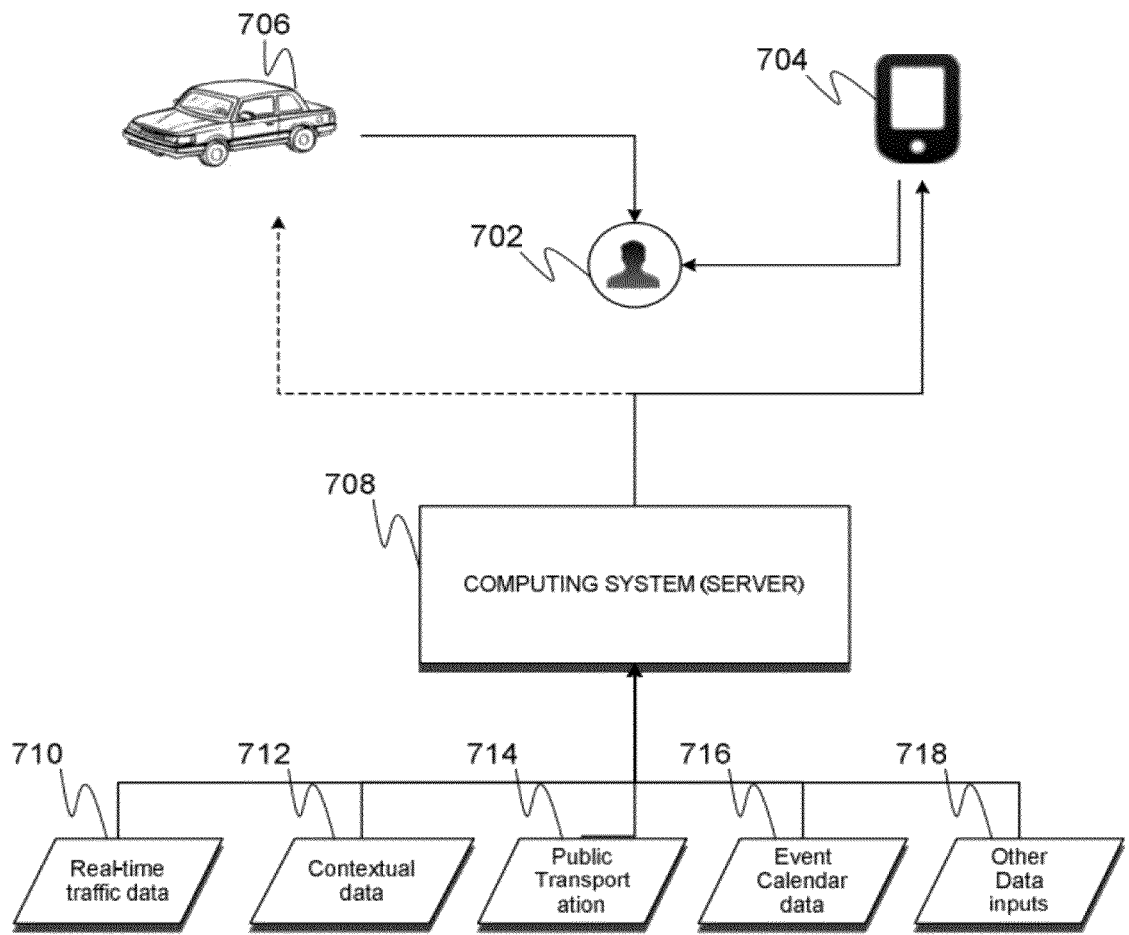
FIG. 7 is a block diagram of an illustrative computer system on which an embodiment of the invention may be implemented.

FIG. 7 is a block diagram of an embodiment of a computer device or a system arrangement of multiple devices for implementing the present invention. The system may incorporate a number of service entities such as servers 708 managing the service based on input data such as preferably real-time and/or estimationbased traffic data 710, contextual data 712 such as vehicle details, public transportation data 714 such as route and schedule data, event calendar data 716 and potential various other inputs 718 such as map data, carbon footprint data, etc. Further input data such as ride offers and requests may be obtained from users 702 via their terminal devices 704, 706. Accordingly, the service may be configured to determine feasible transport sharing scenarios for the journeys of the users and output indications thereof to the terminals 704, 706. Real-time monitoring may be applied and up-to-date information relevant to the journeys be transmitted even after the departure time of the journeys. The terminals 704, 706 may indicate e.g. current position and/or other details such as speed to the user and/or back to the service 708 if locally determined in the user terminal. In response, the service 708 may be configured to serve the input-providing and/or other users in terms of different useful data such as traffic information, route re-selection, accident information, or traffic jam information.

Figure 8:
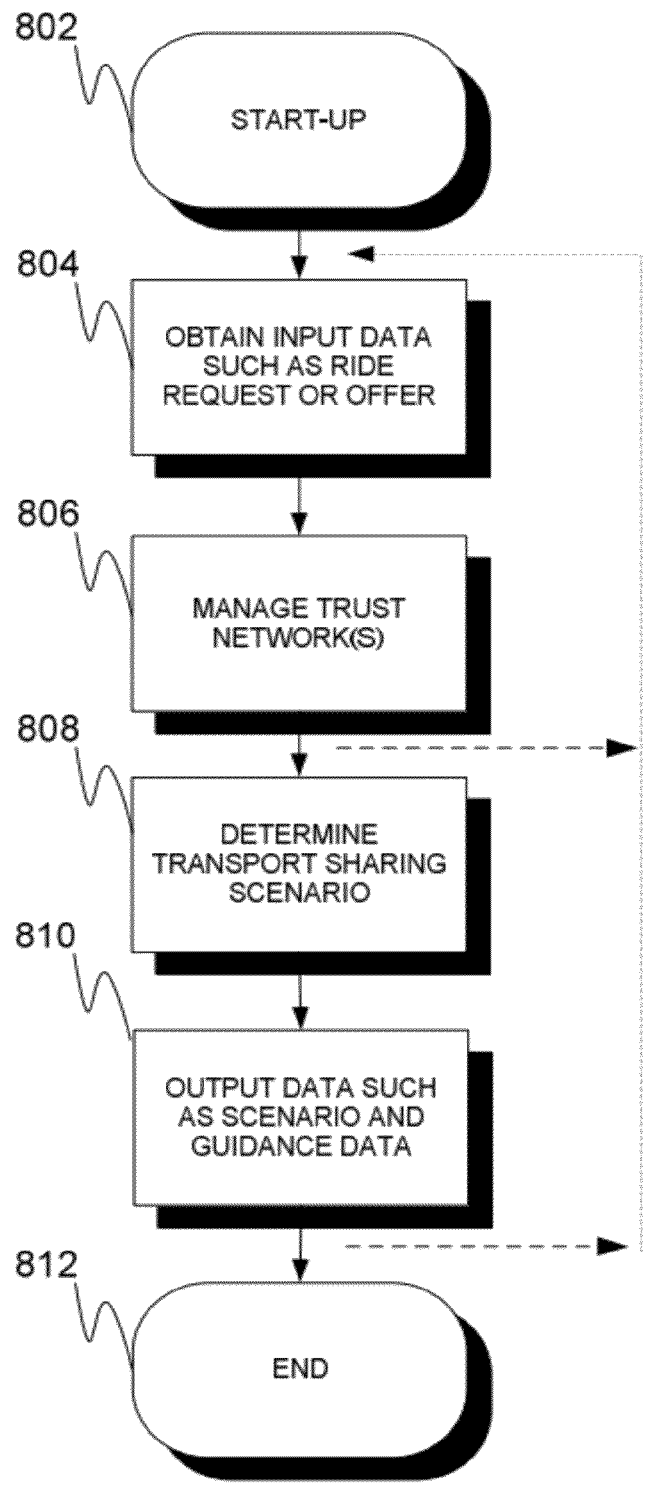
FIG. 8 is a flow diagram of an embodiment of a method in accordance with the present invention.

FIG. 8 discloses a method flow diagram in accordance with an embodiment of the present invention. At 802, different start-up procedures and related data may be executed and obtained, respectively. Necessary hardware and software such as server hardware and software for providing the service may be configured. Alike, terminals may be acquired and application be installed thereat, if necessary. In some embodiments, the service may be accessed via a web browser. In alternative or supplementary embodiments, a dedicated client application may be usable.

At 804, data is input to the service entity for enabling the provision of transport sharing scenario suggestions and related information. The item may incorporate acquisition of user information relative to a plurality of users, data indicative of trust between multiple users and data indicative of a number of ride requests and ride offers by the users, optionally also public transportation data such as schedule and route data, user location data, contextual data such as transport method and/or vehicle details data relative to a user, user calendar data, ride plan data, user history data relative to e.g. time and/or location, POI (place of interest) data, area calendar data such as city event calendar data, real-time traffic data, date data, time data, and/or event data.

At 806, on the basis of the input data a database of trust networks may be accessed. A trust network may be updated, established or terminated on the basis of the input. As a received ride offer is to be assessed in the light of the trust network of the ride provider, access to information about the network, such as member information, may be required and provided during the execution of this item. As a received ride request may be assessed in the light of the trust network of the ride requestor, access to information about the network may be required and provided. A ride offer or request may be published in the service, preferably utilizing the related TN definitions for defining the visibility thereof.

At 808, a potential transport sharing scenario for a plurality of users belonging to the same trust network is generated. A ride request is matched with at least one ride offer in order to determine said scenario.

At 810, the scenario is indicated wholly or relative to a number of selected portions, e.g. personally relevant portions, thereof to the users concerned.

At 812, method execution is ended. The mutual ordering and overall presence of the method items of the method diagrams disclosed above may be altered by a skilled person based on the requirements set by each particular use scenario. The dotted feedback arrows imply the fact how the execution of method items may be controlled and repeated depending on the input, for instance. If the input relates to the construction of a trust network only, the execution may revert after item 806 to item 804 as scenario determination is unnecessary, as being indicated by the upper feedback loop in the figure.

Figure 9:
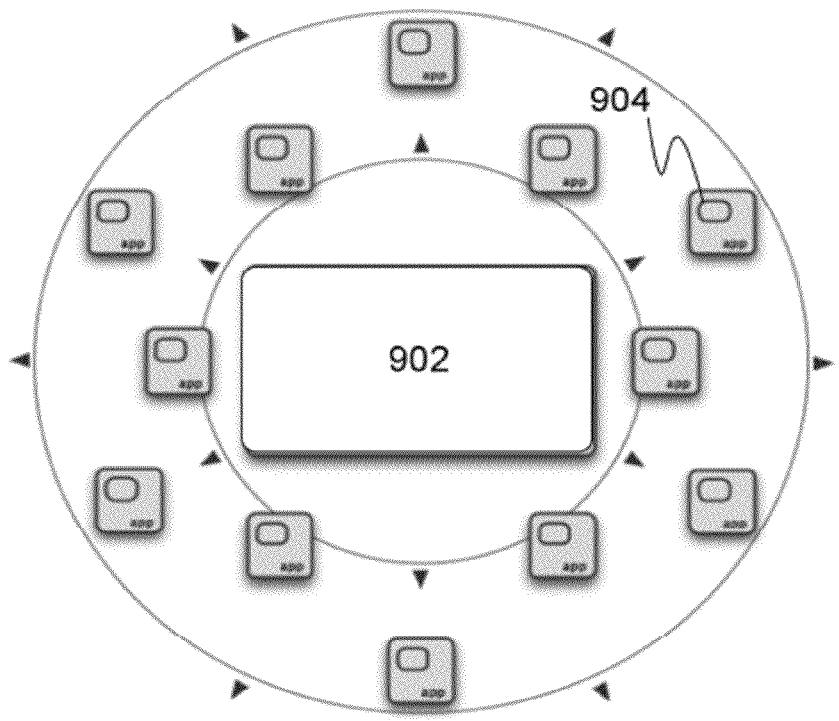
FIG. 9 depicts the concept of various transactional systems utilizing trust networks according to the principles of the present invention.

FIG. 9 depicts the concept 901 of various transactional applications 904 utilizing trust networks as information sources and/or destinations (e.g. repositories), for example. The trust networks and related tools offered by the service infrastructure 902 of the present invention may be applied in numerous applications other than mere transport sharing. In such applications, also similar other input like location and/or time input may be relevant and beneficial. For example, the utilization of privately owned garage places in places like apartment buildings is generally low due to various facts. For example, the actual owners may use their parking slots only after work hours during the night, which implies there is a lot of unused parking potential left provided that a system for managing that is made available. In many cases there the garages may remain more or less empty for more than 7 hours per day, and still the associated facilities such as electricity-based lighting and heating may be kept constantly on practically for nothing. Thus, the transactional system generally capable of matching offers, requests and TN's of the existing users may be configured to allocate and trade parking space on the basis of recorded trust and dynamically emerged needs, in addition to various other possible use scenarios.

Figure 10:
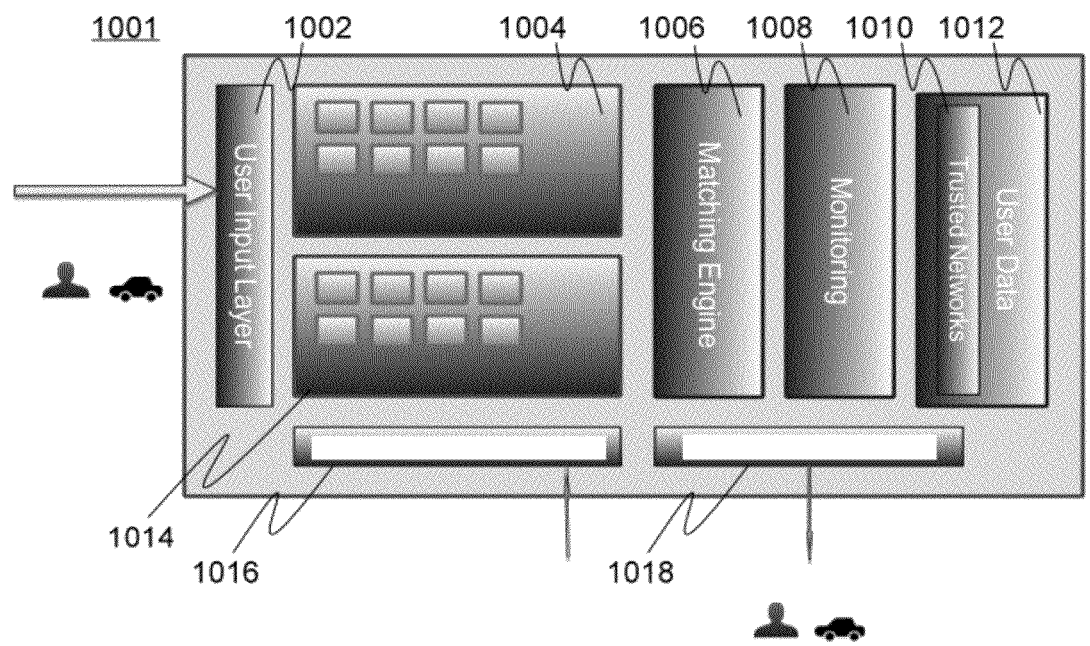
FIG. 10 is a block diagram of an embodiment of a transactional service entity or service system in accordance with the present invention.

FIG. 10 is a block diagram 1001 of an embodiment of a transactional ecosystem in accordance with the present invention. The taken approach is mainly functional and hardware-wise the shown entities may be implemented via combination of hardware (e.g. processing unit and memory) and software (control logic stored in memory for instructing the processing unit to perform actions). User input layer 1002 may be configured to obtain user input relative to e.g. trust networks management, ride offers and ride requests. External data input layer 1016 may provide other data such as map data or schedule data to the service. Static data 1004 may include data that is static or changes relatively rarely such as users' favorite locations (POIs), map data, carbon emission specs of vehicles, public transportation schedules and routes, etc. Dynamic data 1016 may include data input on demand, weather data, traffic data, parking availability data, etc. Matching engine 1006 may be configured to match requests with offers by taking the relevant data into account. Monitoring entity 1008 may track a number of predetermined elements such as user locations, route navigation, environmental aspects such as traffic jams affecting the matching process and/or navigation on the basis of input data, for instance. User data 1012 may incorporate trust network data and service account data. Communication layer 1018 may be utilized to output e.g. indications of determined transport sharing scenarios or real-time navigation data to the service users or other external entities such as external service entities.

Figure 11:
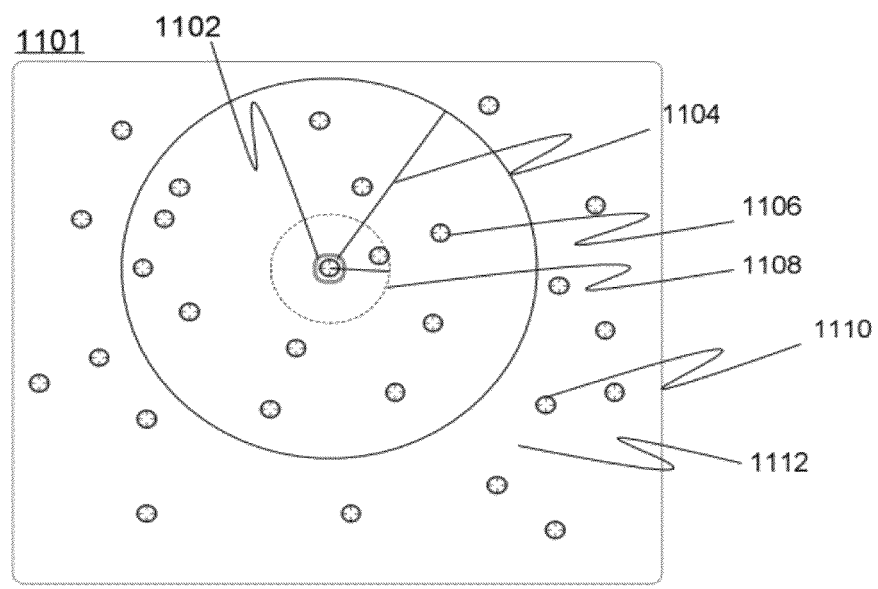
FIG. 11 illustrates an embodiment of a proximity model that may be exploited in conjunction with the present invention.

FIG. 11 illustrates an embodiment of a proximity model that may be exploited in conjunction with the present invention for matching ride offers and requests.

A trust network of user A may be called 'TN-Group A'. Such group of users may include all users of the service that belong to at least one of User A's trust networks. A user may belong to more than one at least conceptually separable TN such as work TN, personal TN, sport club TN, which may be on the other hand considered as sub-networks of a greater trust network A of the user A.

Element 1102 in the center of the graphical representation may refer to e.g. physical geographical location for the departure location of the preferred journey. For instance, user A may be eager to find a ride from street address X to street address Y. Element 1102 would represent X then. The circle around element 1102 may be applied to visually highlight that location.

Element 1104 could refer to an optimum radius determined by the service. Inside that radius most if not all relevant locations associated with the members of group A could be deemed to reside in the light of the ride request.

In some embodiments, the optimum radius could, by way of example only, be calculated based on formula:

Optimum Radius=[Journey length Multiplier*{(1/Number of TN members within proximity)+Time Multiplier+1/Public Transportation availability Multiplier}]*1/Number of Rides Available In other words, the greater the number of TN group A members within a predetermined proximity, the smaller the resulting optimum radius is. Correspondingly, greater journey length (e.g. distance between departure and destination locations) converts into a larger optimum radius. Availability of rides reduces the radius.

Time Multiplier could be defined as Time to journey*Journey length Multiplier*1/(TN size). The radius could be generally bigger when there's more time left until the desired departure time and thus Time to journey could be simply defined as the amount of time left (from the current moment) to the desired departure time.

Public Transportation availability Multiplier may be defined such that more public transportation options such as stops available (bigger multiplier) turns into a smaller radius.

The proximity may be a fixed value. It may be dependent on the associated geographical location. For example, it may be defined such that the resulting area covers a number of predetermined waypoints such as certain places potentially having a special meaning in the context of the present invention. E.g. a junction or a parking area could provide a feasible transition point (node) for passenger pick-up/drop and change of transportation method.

Thus, the service may analyze the departure location according to predetermined logic in order to find a radius of relevance, a kind of a geographical filter, for further determination of the transportation sharing scenario.

Element 1106 refers to a public transportation location (e.g. stop), a POI or a ride offer (departure or intermediate node) location of a member of the user A's TN within the current optimum radius. However, if the service knows by monitoring feature, for example, that the user associated with the POI is not able to take or offer a ride as he/she is in different presumed location at the relevant time or has (has no) transportation, the POI may be omitted from the determination process. Element 1108 refers to the possibility to define or change the optimum radius manually by the user A via the UI of the service. For example, user A may be able to narrow down radius only to the immediate surroundings. The service may be then configured to present available rides in the surroundings only as selected by the user. The service may track radius revisions by the user and learn on the basis thereof. As a result, the radius may be automatically personalized in the long run according to user preferences. This may be utilized in one-tap ride sharing, for example.

Element 1110 may refer to a location associated with a member of trust network group A, but located outside the current optimum radius. For example, the location 1110 could be considered to be reside too far away from the departure location in view of walking distance, time multiplier, etc. The element 1110 could also represent a public transportation stop. Generally, public transportation and related stops may be trusted unless the user A disables the use of selected public transportation means or stops in the service settings.

Element 1112 refers to a visual presentation such as a (street) map of the area related to the location of departure.

Figure 12:
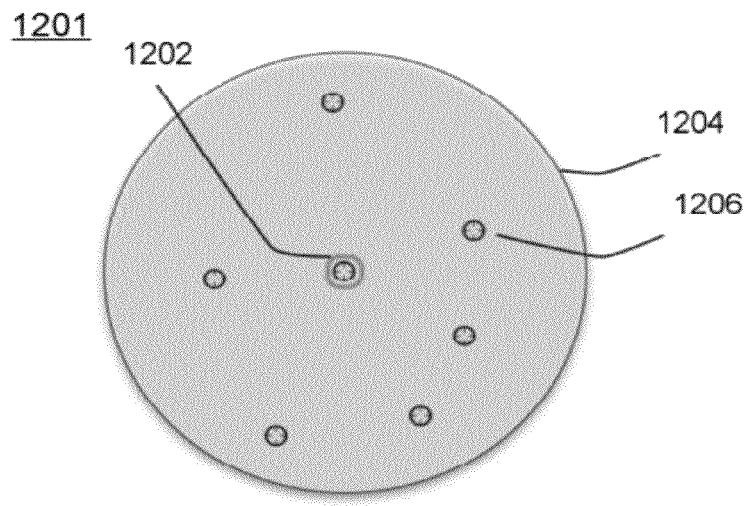
FIG. 12 illustrates an embodiment of a proximity model relating to ride destination.

Correspondingly, FIG. 12 illustrates an embodiment of a proximity model for journey destination Y. In the model visualization 1201, element 1202 refers to destination location of a ride request. The element 1204 refers to the optimum (destination) radius again depending on the availability of rides and e.g. the journey length (distance) generally as was the case with the model of the departure location. Element 300 refers to locations such as end locations of other group A members' journeys, POI locations or public transportation locations that could suit the user A in terms of his/her ride request.

Figure 13:
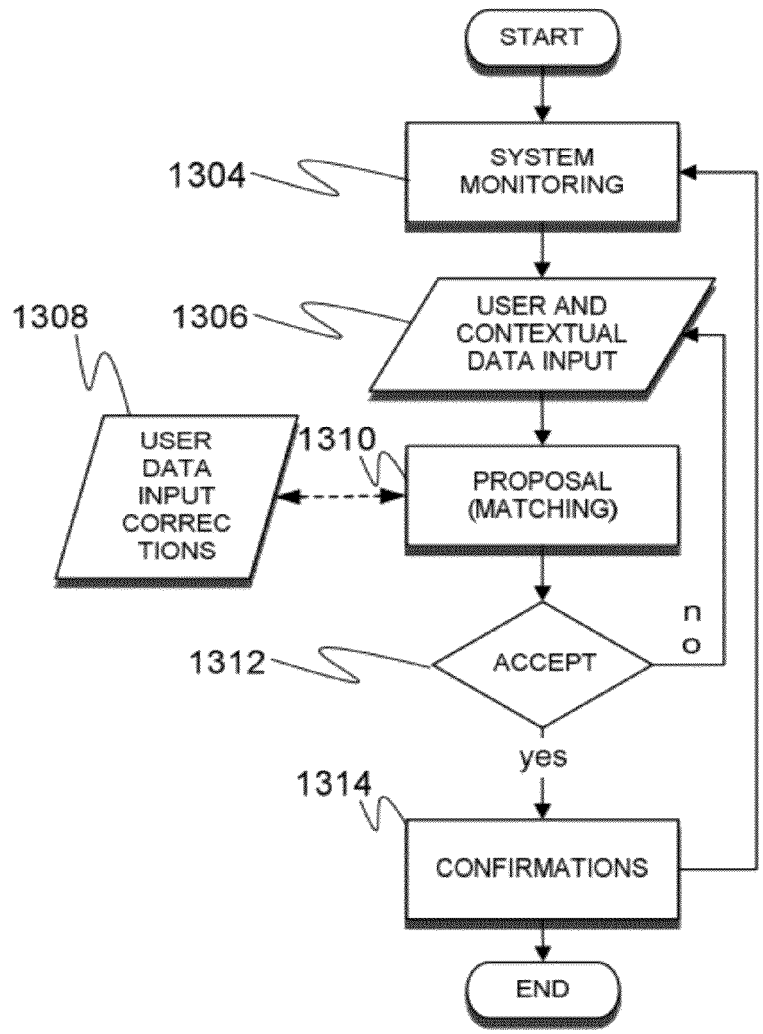
FIG. 13 is flow diagram of an embodiment of the suggested one-tap ride feature.

FIG. 13 is flow diagram of an embodiment of the suggested one-tap ride feature.

At 1304, during general system monitoring the service may automatically keep track, on the basis of input data, of different contextual variables relating to user locations, movements, traffic data, event data, etc. Different locations and statuses of users may be compared with history data for user-specific behavioral modeling, for example. Based on real-time data input and available history data, the service may deduce that at a certain instant such as current or near future instant a certain user is about to leave the office or home for reaching the other, for example. The likely current or future transportation method may be estimated on the basis of real-time data such as route, location and/or speed data, and/or available history data. Database about common habits associated with each user relative to different locations and instants (e.g. time of a day and/or day of a week, month or year) may be thus established and updated upon triggering data input. Accordingly, POI data may be established and managed by the service for each user.

At 1306, a indication of ride request or offer is obtained from a first service user. The indication may be based on one-click or one-tap—based simple input on the UI of the associated terminal, for instance, such that the actual nature of input is not explicitly provided.

At 1310, on the basis of the executed monitoring preferably capitalizing both real-time data and history data (when available), and TN data associated with the user, a scenario proposal may be constructed for the guessed type (ride request/offer) or both main types of user interaction in the service and provided to the concerned user(s) including the first user. Accuracy of the proposals may constantly improve due to more history data becoming available.

At 1312, the concerned user(s) may be provided with an opportunity, such as a confirmation request, to accept the scenario 1314 or reject it, which may funnel the execution back to item 1306 or 1310. The concerned user(s) may be provided with options to inspect the initial or updated scenario proposals, modify the associated optimum ranges and other automatically or manually determined scenario affecting parameters 1308.

Figure 14:
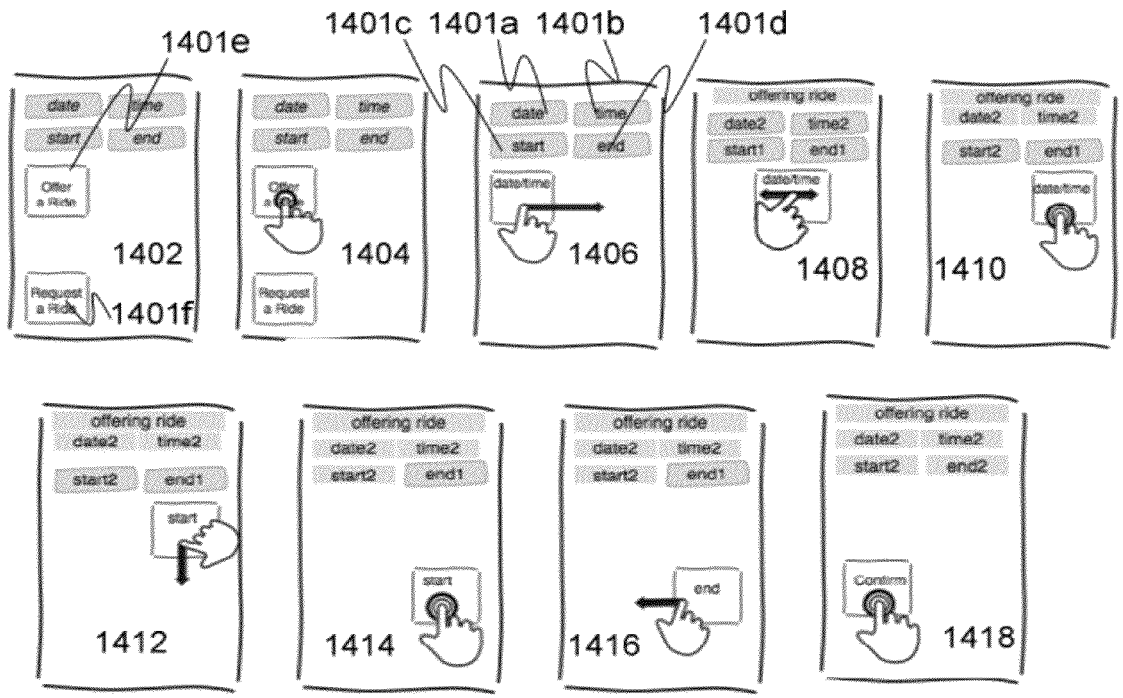
FIG. 14 illustrates an embodiment of a UI, such as the UI of a mobile device, for utilizing the arrangement in accordance with the present invention.

FIG. 14 illustrates an embodiment of a UI, such as the UI of a mobile device, for utilizing the arrangement in accordance with the present invention. The UI may be configured to support one-tap type input and/or more comprehensive more explicit input for service utilization.

In the UI, a number of relevant, preferably selectable and editable, features are shown. The date 1401a may refer to the date of departure of a journey, time 1401b to the time of departure, start 1401c to the location of departure (e.g. exact address typed in or selected on the map, or suggested by the service), end 1401d to destination location, offer a ride 1401e for submitting a corresponding offer to trusted others, and request a ride 1401f for submitting a corresponding request when needing transportation.

At 1402, a 'Home screen' of UI is shown. Based on available data the service may in background determine likely ride requests or ride offers in the light of potential 'one tap' feature activation for each user or a limited number of users, e.g. the users having logged in to the service.

At 1404, the user of the example explicitly selects to offer a ride via the UI.

The UI may be correspondingly updated and e.g. selection option for 'date/time' may be shown. The service may automatically, based on available real-time data such as time data, user location and/or history data as described hereinbefore, pre-determine at least part of a potential ride offer utilizing e.g. an associated proximity model. The user may be able to modify optionally automatically suggested date/time information for the ride by moving the 'button' symbol relative to a timeline or tap it to confirm.

At 1406 and 1408, the user modifies the time of departure by moving the 'date/time' button, and, at 1410, confirms the selection. The service may update the departure and/or destination location estimates in the background.

At 1412, the service may indicate a departure location estimate based on realtime data such as location data and/or history data associated with the user. The user optionally adjusts the start location further by sliding the associated symbol on the touchscreen via a finger, for example, which triggers changing the currently selected location. The user confirms the selection at 1414. In response, the service may update the destination estimate on the basis of departure location confirmation.

At 1416, a suggestion for destination location may be automatically provided to the user. The user may change the destination location and confirm the selection 1418. The ride offer is finalized and made accessible via the service by the trusted users.

Figure 15:
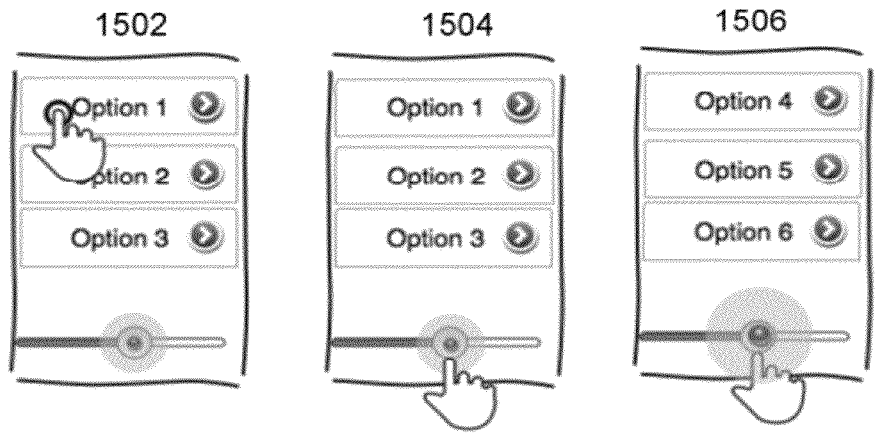
FIG. 15 illustrates an embodiment of the UI for altering the ride details such as the effective radius of the utilized proximity model in accordance with the present invention.

FIG. 15 illustrates an embodiment of the service UI for altering ride details. At 1502, a user is provided with, in response to input data and the applied proximity model, a plurality of transport sharing options optionally in an order sorted according to predetermined criterion such as minimum travel time, minimum walking or public transportation utilization required, minimum number of transportation change needed, best matching departure or destination arrival (estimate) time, and/or desired ride provider. At 1504, the user may provide input such as control a slider feature responsive to the optimum radius of the applied proximity model, whereupon the service may update or at least re-sort the ride options, which is shown at 1506.

Figure 16:
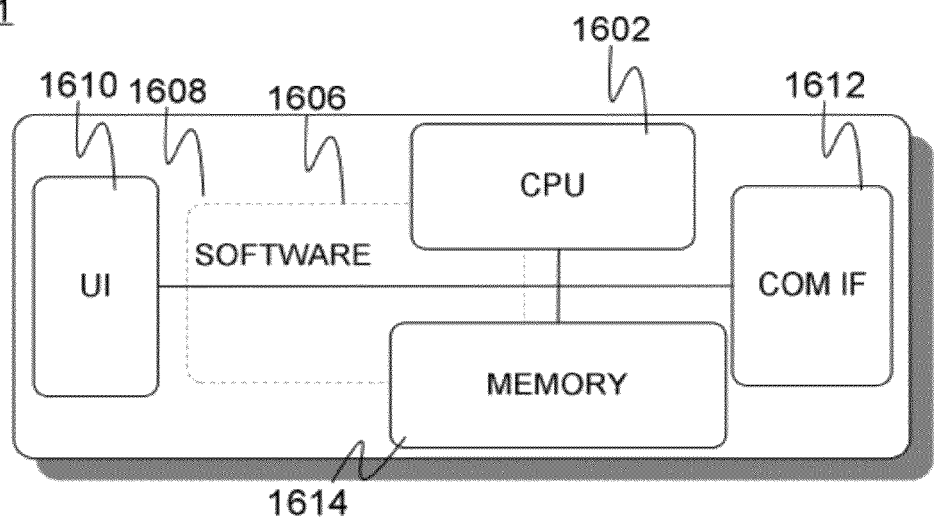
FIG. 16 is a block diagram of an arrangement, such as one or more connected server devices, according to an embodiment of the present invention.

FIG. 16 illustrates the internals 1601 of an embodiment of the electronic service arrangement in accordance with the present invention. The service entity in question is typically provided with one or more processing devices capable of processing instructions and other data, such as one or more microprocessors, micro-controllers, DSPs (digital signal processor), programmable logic chips, etc. The processing entity 1602 may thus, as a functional entity, physically comprise a plurality of mutually co-operating processors and/or a number of sub-processors connected to a central processing unit, for instance. The processing entity 1602 may be configured to execute the code stored in a memory 1614, which may refer to e.g. service management software 1606 in accordance with the present invention. The memory entity 1614 for storing software program instructions and other data may be divided between one or more physical memory chips or other memory elements. The memory 1614 may further refer to and include other storage media such as a preferably detachable memory card, a floppy disc, a CD-ROM, or a fixed storage medium such as a hard drive. The memory 1614 may be non-volatile, e.g. ROM (Read Only Memory), and/or volatile, e.g. RAM (Random Access Memory), by nature.

The software 1606 comprising program code and optionally other data may be provided on a carrier medium such as an optical disc, memory stick, memory chip, hard drive, or a memory card, or be transmitted, as a number of signals, over a network in executable or other, optionally compressed, format.

A local UI (user interface) 1610 may comprise a display, e.g. an (O)LED (Organic LED) display, and/or a connector to an external display or a data projector, and a keyboard/keypad or other applicable control input means (e.g. touch screen or voice control input, or separate keys/buttons/knobs/switches) configured to provide the operator of the arrangement entity with practicable local data visualization and/or device control means. The UI 1610 may include one or more loudspeakers and associated circuitry such as D/A (digital-to-analogue) converter(s) for sound output, and a microphone with A/D converter for sound input. In addition, the arrangement entity comprises an interface 1612 such as at least one transceiver incorporating e.g. a transceiver for wired communication, such as Ethernet or other LAN interface, and/or a wireless transceiver, such as WLAN, Bluetooth or GSM/UMTS transceiver, for general communications with external devices and/or network infrastructure(s). It is clear to a skilled person that the arrangement may comprise few or numerous additional functional and/or structural elements for providing beneficial communication, processing or other features, whereupon this disclosure is not to be construed as limiting the presence of the additional elements in any manner A terminal device utilized by a user to access the service may contain substantially similar elements. Instead of network side software, the terminal software may include a client application for utilizing the service, or alternatively, the service may be accessed via an Internet browser, for example.

Consequently, a skilled person may, on the basis of this disclosure and general knowledge, apply the provided teachings in order to implement the scope of the present invention as defined by the appended claims in each particular use case with necessary modifications, deletions, and additions, if any. For example, instead of limiting ride offers or requests, or other service offers and requests, to one's trust networks, also other service users may be contemplated in applications wherein trust is not an absolutely essential requirement. Moreover, the privacy/publicity of the offers and requests may be adjusted depending on each particular embodiment. Instead of using a TN as the target group for ride requests and ride offers, the user may define a sub-group thereof for general use with all or selected personal ride offers or requests, or the definition may be optional and potentially transaction (offer/request)—specific. Instead or in addition to carbon emissions, other emissions such as small particle emissions could be estimated and optionally utilized in scenario determination.

The invention claimed is:

1. An arrangement of functionally connected electronic devices, comprising:
   a data input entity that obtains data including
   i) user information relative to a plurality of users,
   ii) data indicative of trust between multiple users from the plurality of users, and
   iii) data indicative of a number of ride requests and ride offers by the users,
   a trust network knowledgebase entity that establishes and manages a number of trust networks on the basis of the obtained data, wherein the trust network knowledgebase entity
   i) groups the plurality of the users into a number of trust networks,
   ii) creates a personal ride sharing trusted network specific to a first user for ride sharing within a ride sharing service, the individual personal ride sharing trusted network being implemented as a group of other users with whom the first user has a trust relationship, the trust relationship being sufficiently strong for sharing transportation with in private, iii) adds a number of trusted users in the created personal ride sharing trusted network, and iv) based on input of the first user, removes existing trusted users from the created personal ride sharing trusted network, a scheduling entity that, on the basis of the obtained data, determines a potential transport sharing scenario for a plurality of the users belonging to the same trust network and including the first user, wherein the scheduling entity finds potential shared legs of at least partial matches between the ride requests and the ride offers in order to determine said scenario such that mutual trust exists between concerned users of the ride sharing service for each of the one or more shared legs between the concerned users, and a data output entity that indicates the scenario preferably to multiple users of said plurality of the users, wherein the determined one or more shared legs are indicated at least to the concerned users.

2. The arrangement of claim 1, configured to establish or update the trust networks utilizing a number of criteria including at least one element selected from the group consisting of: indicated personal trust between multiple users, trust credentials, association between multiple users, inherited trust wherein a first user trusted by a second user is then also trusted by a third user trusting the second user, user reputation, and validation status of the identity of a user.

3. The arrangement of claim 1, configured to validate a user utilizing at least one element selected from the group consisting of: e-mail address, phone number, personal digital certificate.

4. The arrangement of claim 1, configured to remove a user from a trust network based on indication of a fulfillment of at least one predetermined criterion, the criterion being selected from the group consisting of: distrust indicated by other user, the user leaving a company or other organization providing the trust associated with the user, user inactivity relative to the service, and user passivity relative to a sent request.

5. The arrangement of claim 1, configured to utilize a ride request incorporating at least one element selected from the group consisting of: location of departure, destination location, desired date, desired time, desired date or time of arrival, desired date or time of departure, and desired vehicle details.

6. The arrangement of claim 1, configured to utilize a ride offer incorporating at least one element selected from the group consisting of: location of departure, destination location, desired date, desired time, desired date or time of arrival, desired date or time of departure, used vehicle details, and used vehicle theoretical and/or current range.

7. The arrangement of claim 1, configured to automatically deduce at least a portion of a ride request or ride offer relative to a user on the basis of at least one element selected from the group consisting of: user location, date, time, user calendar data, history data associated with the user, and place of interest data.

8. The arrangement of claim 1, configured to send a notification to a number of users based on at least one element selected from the group consisting of: traffic jam data, traffic accident data, protest data, parking situation data, weather information, vehicle fuel or energy information, calendar data change, ride provider-related data, ride requestor-related data, flight schedule change, public transportation schedule change, and private ride schedule change.

9. The arrangement of claim 1, configured to classify a more general user input as a ride request or a ride offer based on predetermined logic and available data.

10. The arrangement of claim 1, configured to determine an area or radius of interest indicative of the area for the determination of the transport sharing scenario relative to the departure and/or destination location of a ride request, wherein the area is preferably considered to include the locations considered as relevant in the light of the determination, said locations being associated with the users belonging to at least one trust network of the ride requestor and/or with public transportation locations.

11. The arrangement of claim 1, configured to apply carbon footprint data associated with potential transportation method or vehicle for determining the scenario.

12. The arrangement of claim 1, wherein,
the data output entity indicates, in the preferable scenario, private legs of the overall journey of each concerned user to only the concerned user, and
the data input entity further obtains
public transportation data including schedule and route data,
user location data,
contextual data including transport method and vehicle details data relative to a user,
user calendar data,
ride plan data,
user history data relative to time and location,
place of interest data,
area calendar data including city event calendar data,
realtime traffic data,
date data,
time data, and
event data.

13. The arrangement of claim 1, configured to establish or update the trust networks utilizing a number of criteria including at least one element selected from the group consisting of:
trust credentials including a common employer,
organization between multiple users, and
user reputation at least partially determined by a number of other users through rating and voting.

14. The arrangement of claim 1, configured to validate a user utilizing personal digital certificate including at least one of the group consisting of mobile certificate, social security code, bank account, and TUPAS authentication.

15. The arrangement of claim 1, configured to utilize a ride offer incorporating at least one element selected from the group consisting of: location of departure, destination location, desired date, desired time, desired date or time of arrival, desired date or time of departure, used vehicle details including fuel or energy status or capacity, and used vehicle theoretical and/or current range.

16. The arrangement of claim 1, configured to send a notification to a number of users and update the associated transport sharing scenario based on at least one element selected from the group consisting of: traffic jam data, traffic accident data, protest data, parking situation data, weather information, vehicle fuel or energy information, calendar data change, ride provider-related data, ride requestor-related data, flight schedule change, public transportation schedule change, and private ride schedule change.

17. The arrangement of claim 1, configured to classify a more general user input as a ride request or a ride offer based on predetermined logic and available data, including substantially real-time data and/or history data associated with the user.

18. The arrangement of claim 1, configured to apply carbon footprint data associated with potential transportation method or vehicle for determining the scenario to minimize the carbon emissions.

19. A method for managing transport sharing comprising:
obtaining user information data relative to a plurality of users, including data indicative of trust between multiple users and data indicative of a number of ride requests and ride offers by the users,
managing a database of trust networks on the basis of the obtained user information data, wherein the knowledgebase entity groups a plurality of the users into a number of trust networks, including creating a personal trusted network to a first user for ride sharing and adding a number of trusted users therein and removing existing users therefrom based on input of the first user,
determining a potential transport sharing scenario for a plurality of the users belonging to the same trust network, wherein the scheduling entity is configured to match a ride request with a ride offer in order to determine said scenario such that mutual trust exists between concerned users of a ride sharing service for each shared leg between the concerned users, and
indicating the scenario to said plurality of users, wherein each shared leg of the potentially different personal overall journeys of said plurality of users is indicated.

20. A non-transitory computer-readable medium having program code embodied therein that, when run on a computer, causes the computer to:
obtain user information data relative to a plurality of users, including data indicative of trust between multiple users and data indicative of a number of ride requests and ride offers by the users,
manage a database of trust networks on the basis of the obtained data, wherein the knowledgebase entity groups a plurality of users into a number of trust networks, wherein the knowledgebase entity creates a personal trusted network to a first user for ride sharing and adds a number of trusted users therein and removes existing users therefrom based on input from the first user,
determine a potential transport sharing scenario for a plurality of users belonging to the same trust network, wherein the scheduling entity is configured to match a ride request with a ride offer in order to determine said scenario such that mutual trust exists between concerned users of a ride sharing service for each shared leg between the concerned users, and
indicate the scenario to said plurality of users, wherein at least a shared leg of the potentially different personal overall journeys of said plurality of users is indicated, said indication optionally including schedule data, map data, location data, route data and/or personal contact data.

* * * * *